United States Patent
Sakagami et al.

(10) Patent No.: US 11,808,224 B2
(45) Date of Patent: Nov. 7, 2023

(54) VEHICLE CONTROLLER, VEHICLE CONTROL METHOD, AND MEMORY MEDIUM

(71) Applicant: TOYOTA JIDOSHA KABUSHIKI KAISHA, Aichi-ken (JP)

(72) Inventors: Kentaro Sakagami, Toyota (JP); Shinichi Taniguchi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/192,654

(22) Filed: Mar. 30, 2023

(65) Prior Publication Data

US 2023/0313749 A1 Oct. 5, 2023

(30) Foreign Application Priority Data

Apr. 4, 2022 (JP) ................................. 2022-062476

(51) Int. Cl.
*F02D 41/00* (2006.01)

(52) U.S. Cl.
CPC ...... *F02D 41/0007* (2013.01); *F02D 2250/08* (2013.01)

(58) Field of Classification Search
CPC .......................... F02D 41/0007; F02D 2250/08
See application file for complete search history.

(56) References Cited

U.S. PATENT DOCUMENTS

| | | | |
|---|---|---|---|
| 6,412,479 B1 * | 7/2002 | Canfield | F28D 15/02 123/573 |
| 10,352,280 B2 * | 7/2019 | Yaguchi | F01M 13/00 |
| 11,333,066 B2 * | 5/2022 | Matoba | F01M 13/00 |
| 11,434,793 B2 * | 9/2022 | Himuro | F02B 77/11 |
| 2010/0100297 A1 * | 4/2010 | Nagashima | F02N 19/00 701/101 |
| 2015/0240732 A1 | 8/2015 | Makihara | |
| 2017/0122153 A1 * | 5/2017 | Hampton | F02M 25/06 |
| 2019/0162139 A1 | 5/2019 | Ito | |

FOREIGN PATENT DOCUMENTS

| | | |
|---|---|---|
| JP | 2015-102021 A | 6/2015 |
| JP | 2015-161180 A | 9/2015 |
| JP | 2019-100203 A | 6/2019 |

* cited by examiner

*Primary Examiner* — Carl C Staubach
(74) *Attorney, Agent, or Firm* — HAUPTMAN HAM, LLP

(57) ABSTRACT

A vehicle controller is provided. A first passage of a supply passage of a blow-by gas processing device is connected to a portion of an intake passage located downstream of a compressor of a forced-induction device. The first passage includes a connection portion connected to the intake passage. A portion of the first passage between the connection portion and a PCV valve is a passage downstream portion. A supercooling determination process determines whether the supply passage is supercooled by relative wind of a vehicle based on a travel speed of the vehicle. An operating state changing process sets operation of the internal combustion engine to non-boosting operation when an ambient temperature of the vehicle is less than or equal to a determination temperature, the PCV valve is determined as being closed, and the supply passage is determined as being supercooled.

12 Claims, 8 Drawing Sheets

VEHICLE CONTROLLER, VEHICLE CONTROL METHOD, AND MEMORY MEDIUM

RELATED APPLICATIONS

The present application claims priority of Japanese Application Number 2022-062476 filed on Apr. 4, 2022, the disclosure of which is hereby incorporated by reference herein in its entirety.

BACKGROUND

1. Field

The present disclosure relates to a vehicle controller, a control method, and a memory medium that are employed in a vehicle including an internal combustion engine.

2. Description of Related Art

Japanese Laid-Open Patent Publication No. 2019-100203 discloses a controller that is employed in a vehicle. The vehicle includes an internal combustion engine and an actuator. The actuator is activated such that gas flows to a portion of the internal combustion engine subject to scavenging.

After the internal combustion engine stops operating, the controller operates the actuator such that gas flows to the portion subject to scavenging in a case in which at least one of a specific temperature condition and a specific humidity condition is satisfied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a vehicle controller. The vehicle controller is employed in a vehicle that includes an internal combustion engine. In the vehicle controller, the internal combustion engine includes an intake passage, an exhaust passage, a forced-induction device, and a blow-by gas processing device. The forced-induction device includes a turbine disposed on an exhaust passage and a compressor disposed on an intake passage of the internal combustion engine. The blow-by gas processing device includes a supply passage through which blow-by gas is supplied to the intake passage. The supply passage includes a first passage and a second passage. The first passage is connected to a portion of the intake passage downstream of the compressor. The second passage is connected to a portion of the intake passage upstream of the compressor. The blow-by gas processing device includes a PCV valve located on the first passage.

The first passage includes a connection portion connected to the intake passage. A portion of the first passage between the connection portion and the PCV valve is referred to as a passage downstream portion. The PCV valve is closed when pressure in the passage downstream portion becomes greater than or equal to a specified pressure. The controller includes execution circuitry that acts as an execution device. Operation of the internal combustion engine in which intake air flowing through the intake passage is pressurized by the forced-induction device is boosting operation. Operation of the internal combustion engine in which the intake is not pressurized by the forced-induction device is referred to as non-boosting operation. The execution circuitry executes a valve-closed determination process that determines whether the PCV valve is closed and a supercooling determination process that determines whether the supply passage is supercooled by relative wind based on a travel speed of the vehicle. The execution circuitry also executes an operating state changing process when a condition in which an ambient temperature of the vehicle is less than or equal to a determination temperature, a condition in which the PCV valve is determined as being closed through the valve-closed determination process, and a condition in which the supply passage is determined as being supercooled through the supercooling determination process are all satisfied. The operating state changing process sets the pressure in the passage downstream portion to be less than the specified pressure by setting the operation of the internal combustion engine to the non-boosting operation.

In the above configuration, as compared with when boosting operation is selected, the pressure in the passage downstream portion of the first passage is lower by setting the operation of the internal combustion engine to non-boosting operation. That is, the pressure in the passage downstream portion is set to be less than the specified pressure by setting the operation of the internal combustion engine to non-boosting operation. When the pressure in the passage downstream portion is less than the specified pressure, the PCV valve is open. This causes blow-by gas to be supplied from the first passage to the intake passage. When the operation of the internal combustion engine is boosting operation, the pressure in the passage downstream portion is greater than or equal to the specified pressure. In this case, the PCV valve is closed. Thus, the supply of blow-by gas to the supply passage through the first passage is stopped. Accordingly, the blow-by gas is supplied from the second passage to the intake passage.

In the internal combustion engine, when the supply passage of the blow-by gas processing device continues to be excessively cooled with the PCV valve closed, the water in the supply passage may potentially be frozen. The second passage is located farther from the cylinders of the internal combustion engine than the first passage. Thus, the second passage is more likely to be affected by relative wind than the first passage. Thus, when the second passage is supercooled, the amount of cooling performed on the second passage by the relative wind tends to be larger than the amount of heat received by the second passage through the supply of blow-by gas to the second passage. When the cooling amount remains greater than the heat receiving amount, the water contained in the blow-by gas may potentially be frozen in the second passage. Thus, for the water in the second passage not to be frozen, it is preferred that blow-by gas do not flow through the second passage. In contrast, the first passage is less likely to be affected by relative wind than the second passage. Thus, the amount of heat received by the second passage through the supply of blow-by gas to the first passage can be greater than the amount of cooling performed on the first passage by the relative wind. Accordingly, it is preferred that blow-by gas be supplied to the first passage for the water in the first passage not to be frozen.

Hence, the vehicle controller executes the operating state changing process when the condition (i) in which the ambient temperature of the vehicle is less than or equal to the determination temperature, the condition (ii) in which the PCV valve is determined as being closed through the valve-closed determination process, and the condition (iii) in which the supply passage is determined as being supercooled through the supercooling determination process are all satisfied. The operating state changing process sets the operation of the internal combustion engine to non-boosting operation, and thus sets the pressure in the passage downstream portion of the first passage to be less than the specified pressure. As a result, the PCV valve opens. This causes blow-by gas to flow through the first passage and causes blow-by gas to stop flowing through the second passage. Thus, the blow-by gas flowing through the first passage warms the first passage to prevent water from being frozen in the first passage. In contrast, the blow-by gas does not flow through the second passage. This prevents the water contained in the blow-by gas from being frozen.

Accordingly, the vehicle controller prevents water from being frozen in the supply passage of the blow-by gas processing device when the vehicle is traveling.

Some internal combustion engines include a forced-induction device and a blow-by gas processing device. The blow-by gas processing device includes a supply passage through which blow-by gas is supplied to the intake passage. When the vehicle is traveling, relative wind cools the supply passage. As the ambient temperature of the vehicle becomes lower, the amount of cooling performed on the supply passage by the relative wind becomes larger. Thus, when the vehicle is traveling under an extremely low-temperature condition, the relative wind continues to supercool the supply passage. Accordingly, water may potentially be frozen in the supply passage. That is, when the vehicle is traveling, the frozen water may close the supply passage. Such a risk is reduced by the vehicle controller.

In an aspect of the vehicle controller, the execution circuitry determines, in the supercooling determination process, that the supply passage is supercooled when the travel speed is greater than or equal to a determination speed.

As the travel speed of the vehicle becomes higher, the amount of cooling performed on the supply passage by the relative wind becomes larger. Thus, the vehicle controller determines that the supply passage is supercooled when the travel speed is greater than or equal to the determination speed. When the travel speed is greater than or equal to the determination speed, water is prevented from being frozen in the supply passage by executing the operating state changing process.

In an aspect of the vehicle controller, the execution circuitry determines, in the supercooling determination process, whether the supply passage is supercooled based on the travel speed and an engine rotation speed of the internal combustion engine.

Depending on the engine rotation speed, water may be frozen in the supply passage even if the travel speed is less than the determination speed. Thus, the vehicle controller determines whether the supply passage is supercooled based on the travel speed and the engine rotation speed. When the supply passage is determined as being supercooled based on the travel speed and the engine rotation speed, the operating state changing process is executed. When the current travel speed and engine rotation speed are maintained, water may be frozen in the supply passage. In such a case, the operating state changing process is executed to open the PCV valve. This prevents water from being frozen in the supply passage.

In an aspect of the vehicle controller, when the vehicle includes a transmission, it is preferred that the operating state changing process include a process that changes a gear ratio of the transmission.

To maintain the travel speed of the vehicle while changing the gear ratio of the transmission, the engine load factor and the engine rotation speed of the internal combustion engine are changed. When the engine load factor and the engine rotation speed are changed, the forced-induction device is driven in a different manner. This changes the pressure in the portion of the intake passage downstream of the compressor. That is, the pressure in the passage downstream portion of the first passage changes.

Thus, in the vehicle controller, when the operating state changing process is executed, the gear ratio of the transmission is changed such that the pressure in the passage downstream portion becomes less than the specified pressure. Thus, executing the operating state changing process opens the PCV valve. This prevents water from being frozen in the supply passage while also preventing the travel speed from changing.

In an aspect of the vehicle controller, the execution circuitry alternately repeats the operating state changing process and a return process when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied. The return process returns the value of the gear ratio to a value of the gear ratio obtained before the operating state changing process was started.

The value of the gear ratio of the transmission selected when the operating state changing process is executed is smaller than the value of the gear ratio selected when the operating state changing process is not executed. Thus, when the operating state changing process continues to be executed, the gear ratio of the transmission will not be higher. In this case, the driver of the vehicle may feel uncomfortable. Further, even if the three conditions are satisfied, water will not be immediately frozen in the supply passage by opening the PCV valve.

Thus, the vehicle controller alternately repeats the operating state changing process and the return process. Thus, even if the three conditions are satisfied, there is a period during which the gear ratio of the transmission becomes higher. This prevents water from being frozen in the supply passage while changing the gear ratio of the transmission to be higher.

In an aspect of the vehicle controller, the execution circuitry starts the operating state changing process after a predetermined delay time elapses when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied.

From when the three conditions are all satisfied to when the delay time passes, the vehicle controller can keep the gear ratio of the transmission relatively high. After the delay time passes and then the operating state changing process is executed, the gear ratio of the transmission is changed to be lower than that obtained before the operating state changing process is started. Thus, the pressure in the passage downstream portion of the first passage is set to be less than the specified pressure by setting the operation of the internal combustion engine to non-boosting operation. That is, the PCV valve can be opened. This prevents water from being frozen in the supply passage while providing a period during which the gear ratio of the transmission is set to be higher.

In an aspect of the vehicle controller, when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied, the execution circuitry determines that the PCV valve was opened by executing the operating state changing process in a case in which the PCV valve opened when an operating state of the internal combustion engine changed in a period during which the operating state changing process was not executed.

In the vehicle controller, there is a period during which the operating state changing process is not being executed even when none of the three conditions is satisfied. Thus, in a case in which the PCV valve opens after the operating state of the internal combustion engine changes in the period during which the operating state changing process is not executed, it is determined that the PCV valve opens because of the execution of the operating state changing process. Thus, when the three conditions are all satisfied, the vehicle controller alternately repeats the operating state changing process and the return process to start the return process at a relatively early time. This allows the gear ratio of the transmission to be changed to be higher more often while also preventing water from being frozen in the supply passage.

In an aspect of the vehicle controller, the execution circuitry executes a process that measures a cumulative time in a state in which the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied. The execution circuitry also executes a process that resets the cumulative time when starting the operating state changing process. The execution circuitry further executes a process that starts the operating state changing process when the cumulative time exceeds a determination cumulative time. The determination cumulative time is set to be longer than the delay time.

Depending on how the driver uses the vehicle, the operating state changing process may be unable to be executed even if the cumulative time reaches a certain time. Thus, in the vehicle controller, when the cumulative time is greater than the determination cumulative time, the operating state changing process is started even if the duration of the state in which the three conditions are satisfied has not reached the delay time. This prevents situations in which water is frozen in the supply passage because the operating state changing process is not executed.

After the execution of the operating state changing process, water will not be frozen in the supply passage even if the PCV valve is closed until a certain period of time has elapsed since the operating state changing process was executed. Thus, the vehicle controller resets the changing process when the operating state changing process is started.

In an aspect of the vehicle controller, the execution circuitry resets or reduces the cumulative time when one of the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process is not satisfied.

When at least one of the three conditions is not satisfied, it is determined that water will not be frozen in the supply passage. Thus, when at least one of the three conditions is not satisfied, the vehicle controller resets or reduces the cumulative time. This prevents the operating state changing process from being executed more often while also preventing water from being frozen in the supply passage.

In an aspect of the vehicle controller, the vehicle may be a hybrid electric vehicle that further includes a motor generator as a power source. In this case, it is preferred that the operating state changing process include a process that increases an output torque of the motor generator.

In the vehicle controller, the operating state changing process is executed to change the operation of the internal combustion engine to non-boosting operation such that the pressure in the passage downstream portion of the first passage becomes less than the specified pressure. This decreases the output torque of the internal combustion engine and increases the output torque of the motor generator. That is, the total sum of the torque output from the power source of the vehicle remains unchanged depending on whether the operating state changing process is executed. This prevents water from being frozen in the supply passage while also preventing a decrease in the travel speed of the vehicle.

Another aspect of the present disclosure may provide a vehicle control method for executing the processes according to any one of the above vehicle controllers.

A further aspect of the present disclosure may provide a non-transitory computer-readable memory medium that stores a program that causes a processor to execute the processes according to any one of the above vehicle controllers.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller, a vehicle control method, and a vehicle control process according to a first embodiment will now be described with reference to FIGS. 1 to 7.

Figure 1:
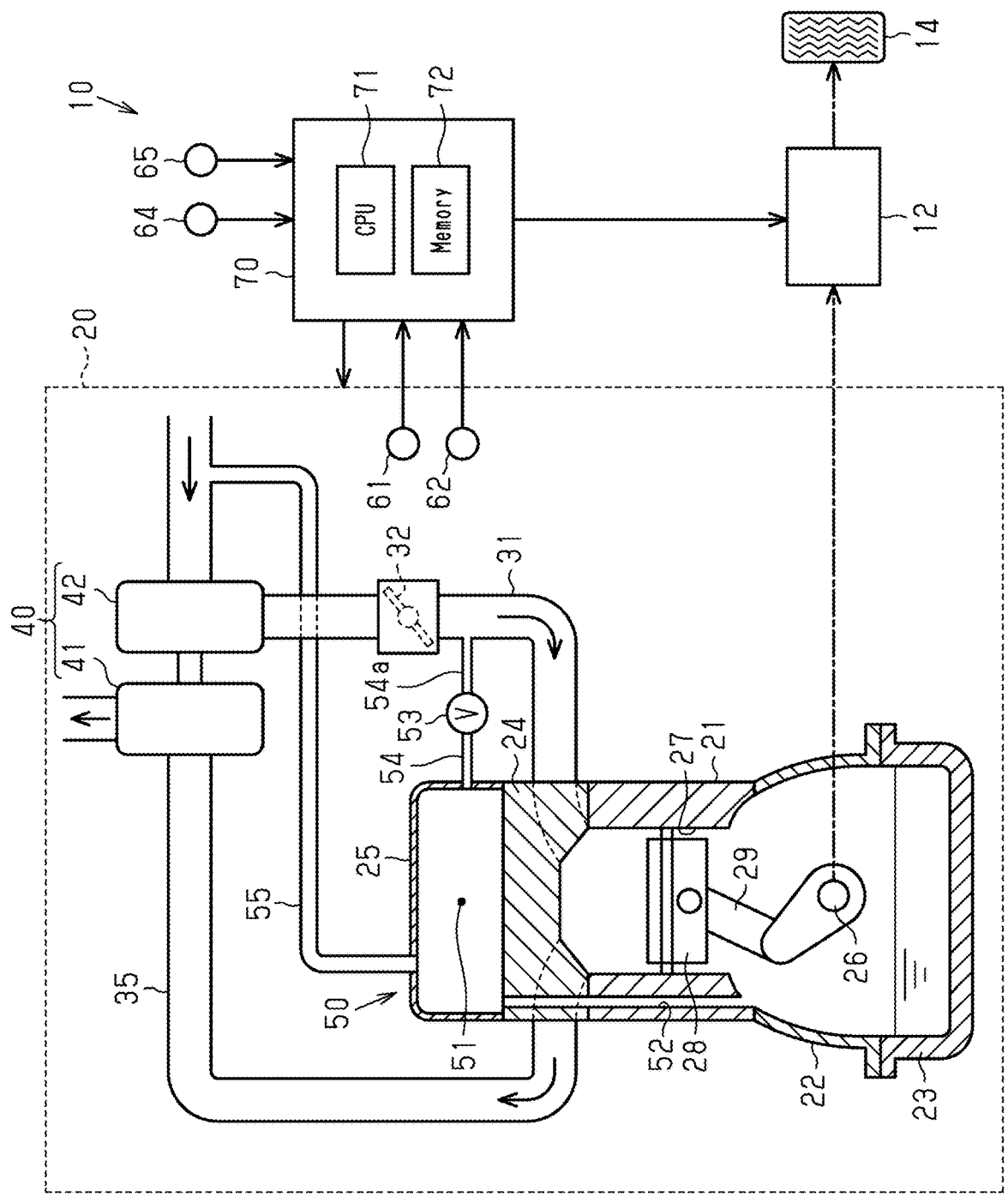
FIG. 1 is a diagram schematically showing the configuration of a vehicle that includes a vehicle controller according to a first embodiment.

FIG. 1 shows a vehicle 10 in which a controller 70 (vehicle controller) is employed. The vehicle 10 includes an internal combustion engine 20, a transmission 12, and driven wheels 14.

The transmission 12 is located in a torque transmission path from the internal combustion engine 20 to the driven wheels 14. In the present embodiment, the transmission 12 is a multi-speed transmission. Thus, when the gear position selected by the transmission 12 is changed, the gear ratio of the transmission 12 changes. That is, when the gear position selected by the transmission 12 is changed to be lower, the gear ratio of the transmission 12 changes to be lower.

Internal Combustion Engine

The internal combustion engine 20 includes a cylinder block 21, a crankcase 22, an oil pan 23, a cylinder head 24, and a head cover 25.

The crankcase 22 is attached to a lower part of the cylinder block 21. The crankcase 22 accommodates a crankshaft 26, which is an output shaft of the internal combustion engine 20. The oil pan 23 is attached to a lower part of the crankcase 22. The oil pan 23 stores the oil that circulates in the internal combustion engine 20.

The cylinder head 24 is attached to an upper part of the cylinder block 21. The cylinder block 21 and the cylinder head 24 define cylinders 27. FIG. 1 shows only one of the cylinders 27. The head cover 25 is attached to an upper part of the cylinder head 24.

The internal combustion engine 20 includes the same number of pistons 28 and connecting rods 29 as that of the cylinders 27. Each cylinder 27 accommodates a corresponding piston 28 that is connected to the crankshaft 26 by a corresponding connecting rod 29. Reciprocating motion of the pistons 28 in the cylinders 27 causes the crankshaft 26 to rotate.

The internal combustion engine 20 includes an intake passage 31 connected to the cylinder head 24. The intake passage 31 is a passage through which intake air drawn into the cylinders 27 flows. The intake passage 31 includes an electric throttle valve 32 that regulates an intake air amount, which is the amount of intake air that flows through the intake passage 31 as shown by the arrow in FIG. 1. In the cylinders 27, air-fuel mixture containing the fuel injected into the cylinders 27 and the intake air is burned. When the air-fuel mixture is burned in this manner, exhaust gas is generated in the cylinders 27.

The internal combustion engine 20 includes an exhaust passage 35 connected to the cylinder head 24. Exhaust gas is discharged from the cylinders 27 to the exhaust passage 35. The exhaust gas flows through the exhaust passage 35 as shown by the arrow in FIG. 1.

The internal combustion engine 20 includes an exhaust-driven forced-induction device 40. The forced-induction device 40 includes a turbine 41 and a compressor 42 that are arranged in the exhaust passage 35 and the intake passage 31, respectively. The compressor 42 is located upstream of the throttle valve 32 in the intake passage 31. The stream of the exhaust gas flowing through the exhaust passage 35 drives the turbine 41. This drives the compressor 42 in synchronization with the turbine 41. When the compressor 42 is driven in this manner, the intake air flowing through the intake passage 31 is pressurized and drawn into the cylinders 27. When the compressor 42 is driven in this manner, the pressure in the portion of the intake passage 31 downstream of the throttle valve 32 is positive. When the compressor 42 is not running, the pressure in the portion of the intake passage 31 downstream of the throttle valve 32 is negative.

In the present embodiment, the operation of the internal combustion engine 20 in which intake air is pressurized using the forced-induction device 40 is referred to as boosting operation. The operation of the internal combustion engine 20 in which intake air is not pressurized using the forced-induction device 40 is referred to as non-boosting operation.

The internal combustion engine 20 includes a blow-by gas processing device 50. The blow-by gas processing device 50 includes an accumulation chamber 51 and a connection passage 52. The accumulation chamber 51 is defined by the cylinder head 24 and the head cover 25. The accumulation chamber 51 accumulates the blow-by gas produced in the internal combustion engine 20. The connection passage 52 connects the inside of the crankcase 22 to the accumulation chamber 51. The connection passage 52 extends over the cylinder block 21 and the cylinder head 24. Thus, the blow-by gas leaked from the cylinders 27 into the crankcase 22 flows through the connection passage 52 into the accumulation chamber 51.

The blow-by gas processing device 50 includes a positive crankcase ventilation (PCV) valve 53 and a blow-by gas supply passage (54, 55) through which the blow-by gas accumulated in the accumulation chamber 51 is supplied to the intake passage 31. The blow-by gas supply passage is a passage which connects the accumulation chamber 51 to the intake passage 31 and through which blow-by gas is supplied to the intake passage 31. The blow-by gas supply passage of the blow-by gas processing device 50 includes a first passage 54 and a second passage 55. The first passage 54 is connected to a portion of the intake passage 31 downstream of the compressor 42. Specifically, the first passage 54 is connected to the portion of the intake passage 31 downstream of the throttle valve 32. The second passage 55 is connected to a portion of the intake passage 31 upstream of the compressor 42.

The PCV valve 53 is located on the first passage 54. The portion that connects the first passage 54 to the intake passage 31 is referred to as a downstream connection portion. The portion of the first passage 54 between the downstream connection portion and the PCV valve 53 is referred to as a passage downstream portion 54a. The PCV valve 53 is open when the pressure in the passage downstream portion 54a is less than a specified pressure and is closed when the pressure in the passage downstream portion 54a is greater than or equal to the specified pressure. When the operation of the internal combustion engine 20 is non-boosting operation, a negative pressure is produced in the portion of the intake passage 31 downstream of the throttle valve 32. Since the passage downstream portion 54a is connected to the portion of the intake passage 31 downstream of the throttle valve 32, a negative pressure is also produced in the passage downstream portion 54a. This causes the pressure in the passage downstream portion 54a to be less than the specified pressure. Thus, when the operation of the internal combustion engine 20 is non-boosting operation, the PCV valve 53 opens. While the operation of the internal combustion engine 20 is changing from non-boosting operation to boosting operation, the pressure in the portion of the intake passage 31 downstream of the throttle valve 32 becomes gradually higher. As a result, the pressure in the passage downstream portion 54a also becomes gradually higher. When the pressure in the passage downstream portion 54a becomes greater than or equal to the specified pressure, the PCV valve 53 closes. Then, when the operation of the internal combustion engine 20 changes to boosting operation, the pressure in the portion of the intake passage 31 downstream of the throttle valve 32 becomes positive and thus the pressure in the passage downstream portion 54a remains greater than or equal to the specified pressure. That is, when the operation of the internal combustion engine 20 is boosting operation, the PCV valve 53 is closed.

Figure 2:
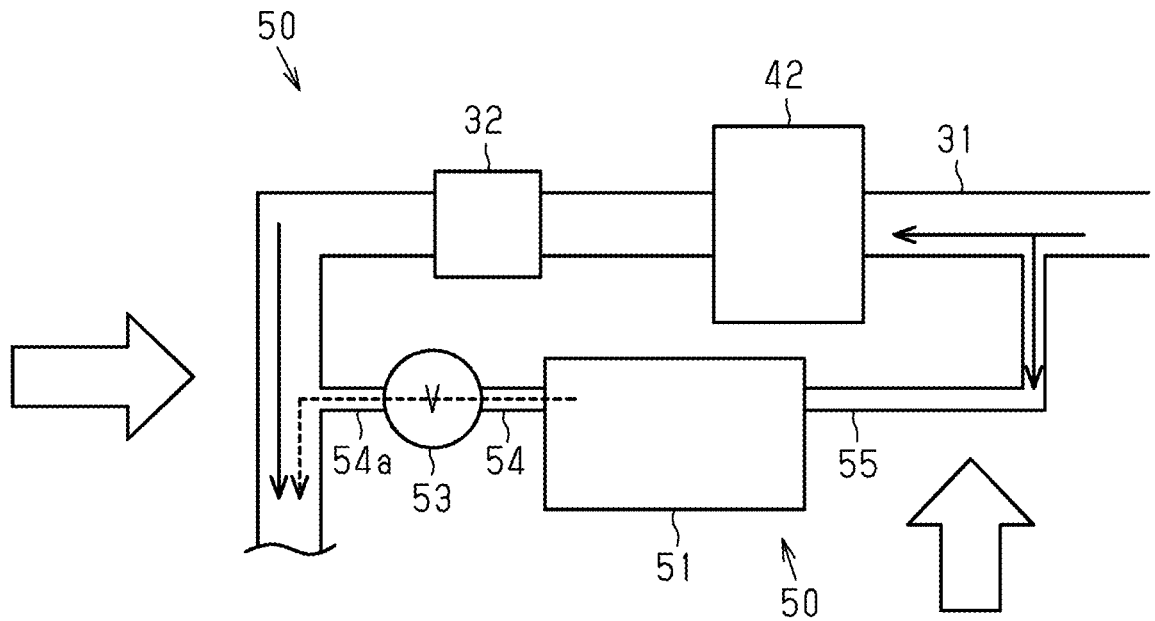
FIG. 2 is a diagram illustrating an operation in which the PCV valve is open in the blow-by gas processing device of the vehicle shown in FIG. 1.

FIG. 2 shows the flow of blow-by gas in a case in which the PCV valve 53 is open. In FIG. 2, the flow of the blow-by gas is shown by the broken line, and the flow of intake air is shown by the solid line. When the PCV valve 53 is open, the blow-by gas in the accumulation chamber 51 is supplied to the intake passage 31 through the first passage 54. Some of the intake air flows into the second passage 55 from the intake passage 31. Thus, when the PCV valve 53 is open, no blow-by gas flows through the second passage 55.

Figure 3:
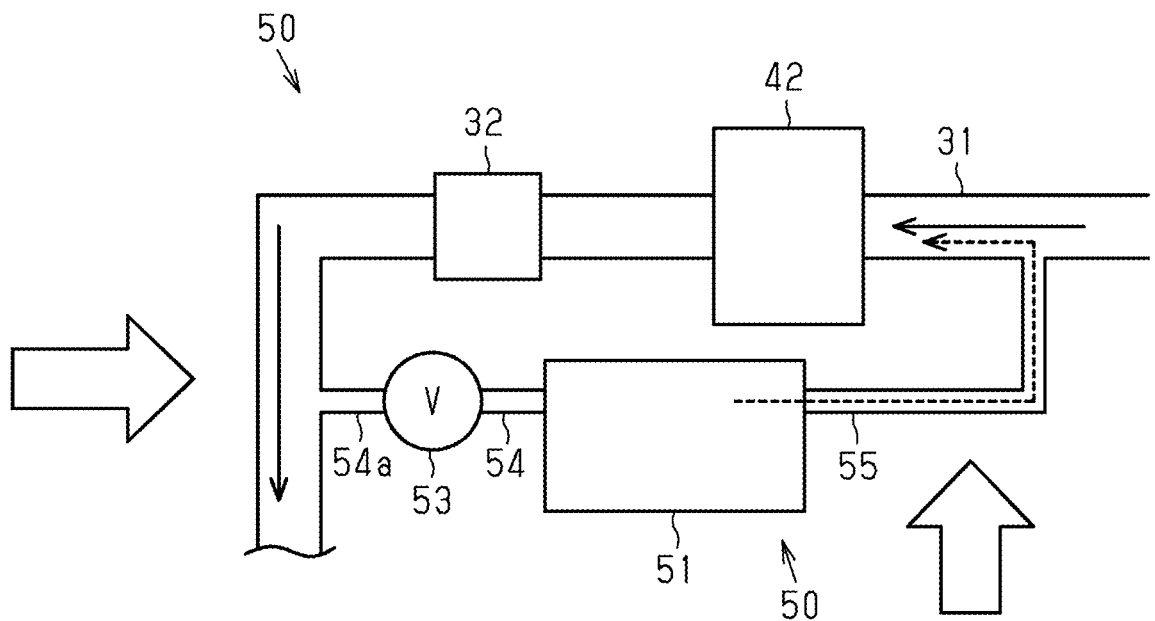
FIG. 3 is a diagram illustrating an operation in which the PCV valve is closed in the blow-by gas processing device shown in FIG. 2.

FIG. 3 shows the flow of blow-by gas in a case in which the PCV valve 53 is closed. In FIG. 3, the flow of the blow-by gas is shown by the broken line, and the flow of intake air is shown by the solid line. When the PCV valve 53 is closed, no gas flows through the first passage 54. Thus, the blow-by gas in the accumulation chamber 51 is supplied to the intake passage 31 through the second passage 55.

As shown in FIG. 1, the internal combustion engine 20 includes a crank angle sensor 61 and an air flow meter 62. The crank angle sensor 61 detects a rotation angle of the crankshaft 26. The crank angle sensor 61 outputs a detection signal corresponding to the rotation speed of the crankshaft 26 to the controller 70. The air flow meter 62 detects the intake air amount, which is the amount of air flowing through the intake passage 31, and outputs a detection signal corresponding to the detection result to the controller 70.

Controller

The controller 70 controls the actuators (i.e., the throttle valve 32 and fuel injection valve) of the internal combustion engine 20 based on the detection values of sensors that include the crank angle sensor 61 and the air flow meter 62. The sensors other than the crank angle sensor 61 and the air flow meter 62 include a vehicle speed sensor 64 and an ambient temperature sensor 65. The vehicle speed sensor 64 detects the travel speed of the vehicle 10. The ambient temperature sensor 65 detects the ambient temperature of the vehicle 10. The rotation speed of the crankshaft 26 based on the detection signal of the crank angle sensor 61 is hereinafter referred to as an engine rotation speed Ne (i.e., engine speed). The detection value of the air flow meter 62 is referred to as an intake air amount Ga. The detection value of the vehicle speed sensor 64 is referred to as a travel speed SP. The detection value of the ambient temperature sensor 65 is referred to as an ambient temperature TMP.

As shown in FIG. 1, the controller 70 corresponds to control circuitry that includes a CPU 71 and a memory 72. The memory 72 corresponds to memory circuitry that executes various control programs executed by the CPU 71. In the present embodiment, the CPU 71 corresponds to an execution device, execution circuitry, a processor, and/or processing circuitry.

When the vehicle 10 is traveling, the components of the internal combustion engine 20 are cooled by relative wind. As shown by the blank arrows in FIGS. 2 and 3, relative wind cools the blow-by gas supply passage (i.e., first passage 54 and second passage 55) of the blow-by gas processing device 50. For example, when the vehicle 10 is traveling in a below-freezing condition, the amount of cooling performed on the blow-by gas supply passage (54, 55) by relative wind is significantly large. This causes the blow-by gas supply passage to be supercooled. In this case, water may potentially be frozen in the blow-by gas supply passage.

In the present embodiment, the distance from the cylinder block 21 to the portion of the second passage 55 connected to the intake passage 31 is longer than the distance from the cylinder block 21 to the portion of the first passage 54 connected to the intake passage 31. Thus, the second passage 55 is more likely to be affected by relative wind than the first passage 54.

In the present embodiment, the CPU 71 executes an operating state changing process when determining that water is likely to be frozen in at least one of the first passage 54 and the second passage 55 (blow-by gas supply passage). The operating state changing process is a process that opens the PCV valve 53 by controlling the gear ratio of the transmission 12 and the operation of internal combustion engine 20 such that the pressure in the passage downstream portion 54a becomes less than the specified pressure.

Figure 4:
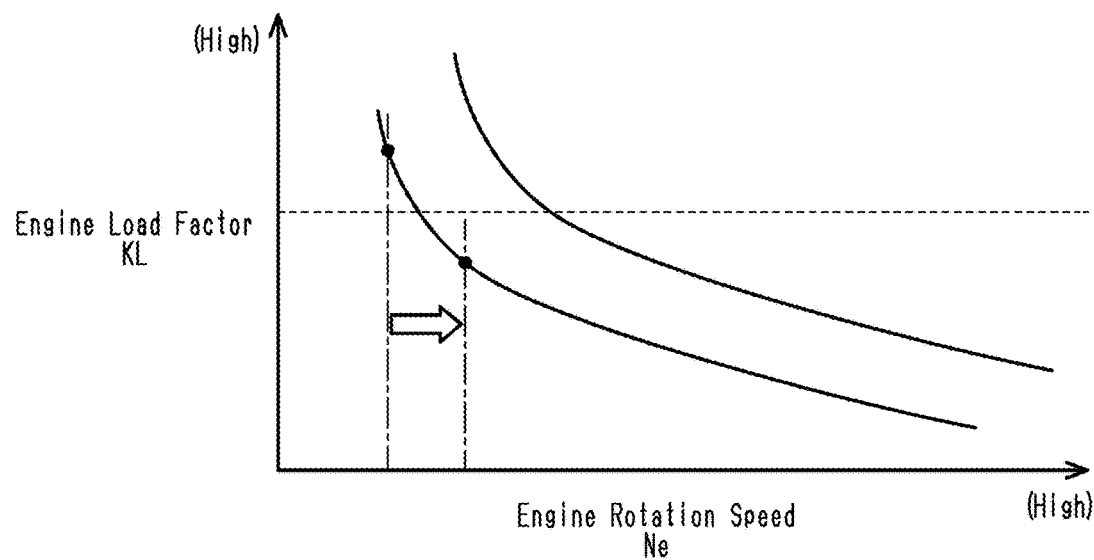
FIG. 4 is a graph showing the relationship between the engine load factor and the engine rotation speed of the internal combustion engine shown in FIG. 1.

The operating state changing process of the present embodiment will now be described with reference to FIG. 4. In FIG. 4, the solid line is an equivalent torque line of the output torque of the internal combustion engine 20. The operation of the internal combustion engine 20 is boosting operation in a region in which the engine load factor KL is higher than the broken line in FIG. 4, which extends horizontally. The operation of the internal combustion engine 20 is non-boosting operation in a region in which the engine load factor KL is lower than the broken line in FIG. 4.

In the operating state changing process, the CPU 71 controls the operation of the internal combustion engine 20 and the gear ratio of the transmission 12 such that the following conditions (C1) and (C2) are satisfied. The engine load factor KL is a value based on the intake air amount Ga and the engine rotation speed Ne. The larger the intake air amount Ga, the higher the engine load factor KL.

Condition (C1): The gear position selected by the transmission 12 when the operating state changing process is executed is set to be lower than the gear position selected by the transmission 12 when the operating state changing process is not executed.

Condition (C2): The output torque of the internal combustion engine 20 is maintained while reducing the engine load factor KL until the pressure in the passage downstream portion 54*a* of the first passage 54 becomes less than the specified pressure.

When the CPU 71 executes the operating state changing process so that the pressure in the passage downstream portion 54*a* becomes less than the specified pressure, the PCV valve 53 opens.

Figure 6:
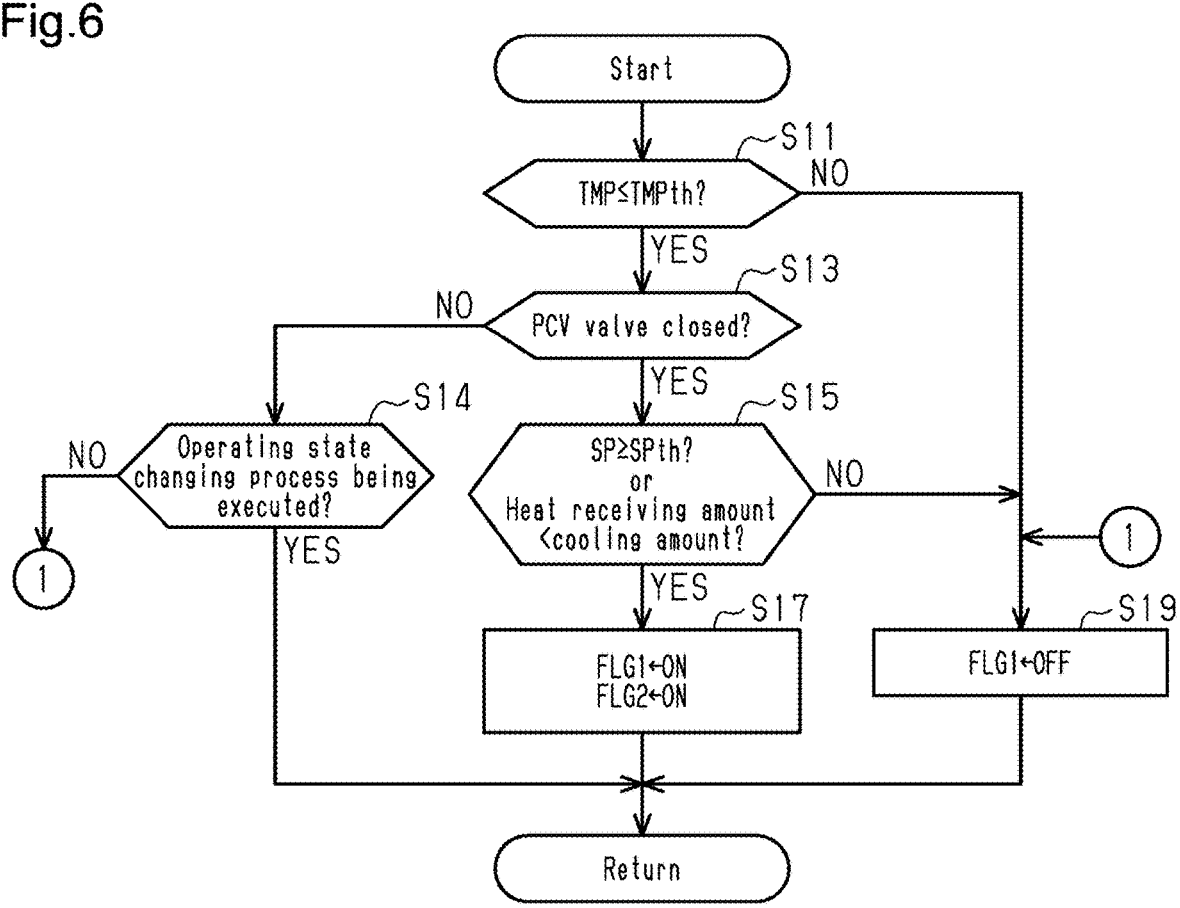
FIG. 6 is a flowchart illustrating a processing routine executed by the vehicle controller of the first embodiment shown in FIG. 1.

Process that Determines whether Water is Likely to be Frozen in Blow-by Gas Supply Passage A processing routine that determines whether water is likely to be frozen in the blow-by gas supply passage will now be described with reference to FIG. 6. The processing routine is repeatedly executed in a predetermined control cycle by the CPU 71 executing the control programs.

In the processing routine, the CPU 71 determines in step S11 whether the ambient temperature TMP of the vehicle 10 is less than or equal to a determination temperature TMPth. For example, the determination temperature TMPth is set as a criterion for determining whether the vehicle 10 is traveling in a below-freezing condition. In a case in which the ambient temperature TMP is greater than the determination temperature TMPth, the CPU 71 determines that the water will not be frozen in the blow-by gas supply passage. In a case in which the ambient temperature TMP is less than or equal to the determination temperature TMPth, the CPU 71 determines that the water is likely to be frozen in the blow-by gas supply passage when the vehicle 10 is traveling. When the ambient temperature TMP is greater than the determination temperature TMPth (S11: NO), the CPU 71 advances the process to step S19. When the ambient temperature TMP is less than or equal to the determination temperature TMPth (S11: YES), the CPU 71 advances the process to step S13.

In step S13, the CPU 71 determines whether the PCV valve 53 is closed. As described above, the passage downstream portion 54*a* of the first passage 54 is connected to the portion of the intake passage 31 downstream of the throttle valve 32. Thus, the CPU 71 determines that the pressure in the portion of the intake passage 31 downstream of the throttle valve 32 is equal to the pressure in the passage downstream portion 54*a*. Thus, the CPU 71 estimates the pressure in the portion of the intake passage 31 downstream of the throttle valve 32 based on the intake air amount Ga, a throttle open degree (the open degree of the throttle valve 32), and the like. The CPU 71 determines that the PCV valve 53 is closed when the estimation value of that pressure is greater than or equal to the specified pressure and is not closed when the estimation value of that pressure is less than the specified pressure. That is, step S13 corresponds to a valve-closed determination process that determines whether the PCV valve 53 is closed. When determining that the PCV valve 53 is not closed (S13: NO), the CPU 71 advances the process to step S14. When determining that the PCV valve 53 is closed (S13: YES), the CPU 71 advances the process to step S15.

In step S14, the CPU 71 determines whether the operating state changing process is being executed. That is, the CPU 71 determines whether the reason that the PCV valve 53 is not closed is that the operating state changing process is being executed. When the operating state changing process is being executed (S14: YES), the CPU 71 temporarily ends the processing routine. When the operating state changing process is not being executed (S14: NO), the CPU 71 advances the process to step S19.

In step S15, the CPU 71 determines whether at least one of the following two conditions (A2) and (A2) is satisfied.

Condition (A1): The travel speed SP of the vehicle 10 is greater than or equal to a determination speed SPth.

Condition (A2): A heat receiving amount, which refers to the amount of heat transferred from the internal combustion engine 20 to the second passage 55, is less than the amount of cooling performed on the second passage 55 by relative wind.

As the travel speed SP becomes higher, the relative wind becomes stronger and thus the amount of cooling performed on the blow-by gas supply passage by the relative wind becomes larger. As a result of performing various experiments and simulations, the inventors of the present application found that the first passage 54 of the blow-by gas supply passage was supercooled when the travel speed SP was greater than or equal to the determination speed SPth. In addition, the inventors of the present application found that water had a risk of being frozen in the first passage 54 when the travel speed SP remained greater than or equal to the determination speed SPth in a situation in which the ambient temperature TMP was less than or equal to the determination temperature TMPth and the PCV valve 53 was closed.

Further, the inventors of the present application found that the second passage 55 of the blow-by gas supply passage was supercooled when the condition (A2) was satisfied regardless of whether the travel speed SP was greater than or equal to the determination speed SPth. Furthermore, the inventors of the present application found that water had a risk of being frozen in the second passage 55 when the condition (A2) remained satisfied in a situation in which the ambient temperature TMP was less than or equal to the determination temperature TMPth and the PCV valve 53 was closed.

Figure 5:
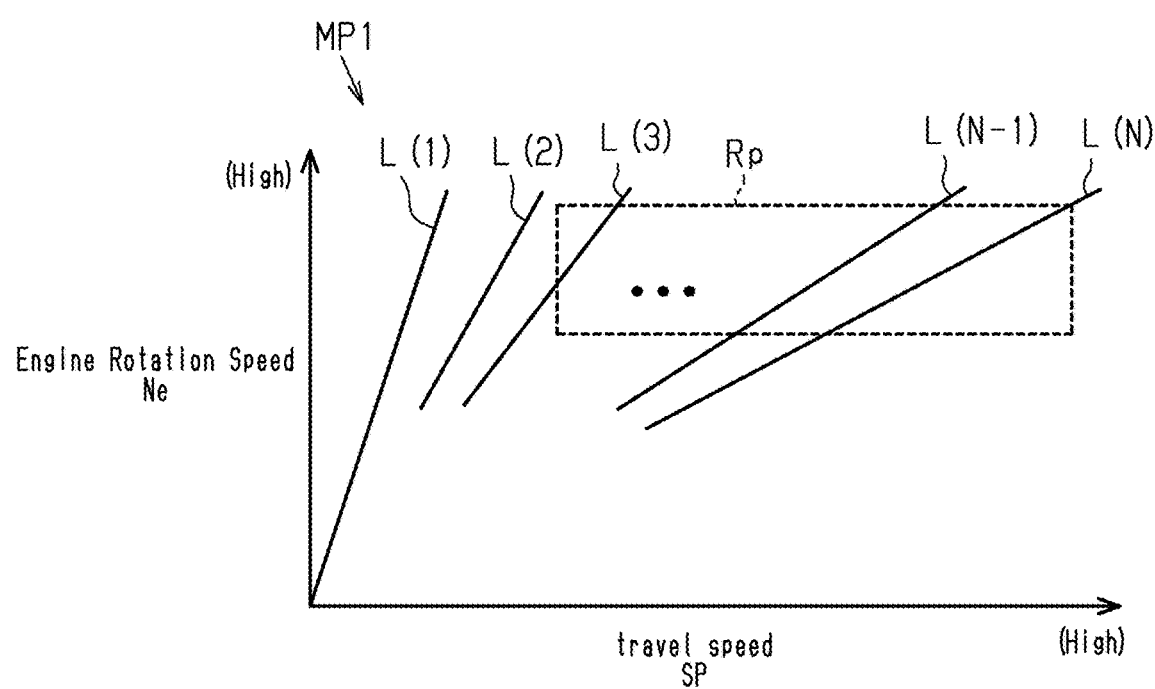
FIG. 5 is a diagram showing a map used to determine whether the blow-by gas supply passage is supercooled, based on the travel speed and the engine rotation speed of the vehicle shown in FIG. 1.

FIG. 5 shows a map MP1 used to determine whether the condition (A2) is satisfied based on the relationship between the engine rotation speed Ne and the travel speed SP. In the map MP1, line L(1) indicates the relationship between the engine rotation speed Ne and the travel speed SP in a case in which the transmission 12 selects a first gear position. Line L(2) indicates the relationship between the engine rotation speed Ne and the travel speed SP in a case in which the transmission 12 selects a second gear position. Line L(3) indicates the relationship between the engine rotation speed Ne and the travel speed SP in a case in which the transmission 12 selects a third gear position. Line L(N-1) indicates the relationship between the engine rotation speed Ne and the travel speed SP in a case in which the transmission 12 selects a (N-1)th gear position. Line L(N) indicates the relationship between the engine rotation speed Ne and the travel speed SP in a case in which the transmission 12 selects a Nth gear position. In this graph, N is an integer greater than or equal to 4. The gear ratio of the transmission 12 in the case in which the Nth gear position is selected is the highest gear ratio that can be set by the transmission 12. The gear ratio of the transmission 12 in the case in which the (N-1)th gear position is selected is the second highest gear ratio that can be set by the transmission 12. The gear ratio of the transmission 12 in the case in which the first gear position is selected is the lowest gear ratio that can be set by the transmission 12. The region shown by the broken line in FIG. 5 is a supercooling region Rp. As a result of performing various experiments and simulations, the inventors of the present application found that the condition (A2) was satisfied when the point indicating the engine rotation speed Ne and the travel speed SP was located in the supercooling region Rp.

Thus, in the present embodiment, the CPU 71 determines that the first passage 54 is supercooled when the condition (A1) is satisfied. Further, the CPU 71 determines that the second passage 55 is supercooled when the condition (A2) is satisfied. Accordingly, the process of step S15 corresponds to a supercooling determination process that determines whether the blow-by gas supply passage is supercooled by relative wind, based on the travel speed SP.

Referring back to FIG. 6, in step S15, when at least one of the conditions (A1) and (A2) is satisfied (S15: YES), the CPU 71 advances the process to step S17. When neither the condition (A1) nor (A2) is satisfied (S15: NO), the CPU 71 advances the process to step S19.

In step S17, the CPU 71 sets a first execution flag FLG1 and a second execution flag FLG2 to ON. When the first execution flag FLG1 is set to ON, the CPU 71 determines that the water is likely to be frozen in the blow-by gas supply passage. When the first execution flag FLG1 is set to OFF, the CPU 71 determines that the water will not be frozen in the blow-by gas supply passage. In a case in which the operating state changing process has not been executed yet since the first execution flag FLG1 was set to ON, the second execution flag FLG2 is set to ON. In a case in which the operating state changing process has been executed once after the first execution flag FLG1 was set to ON, the second execution flag FLG2 is set to OFF. Then, the CPU 71 temporarily ends the processing routine.

In step S19, the CPU 71 sets the first execution flag FLG1 to OFF. Then, the CPU 71 temporarily ends the processing routine.

Process that Prevents Water from Being Frozen in Blow-by Gas Supply Passage

Figure 7:
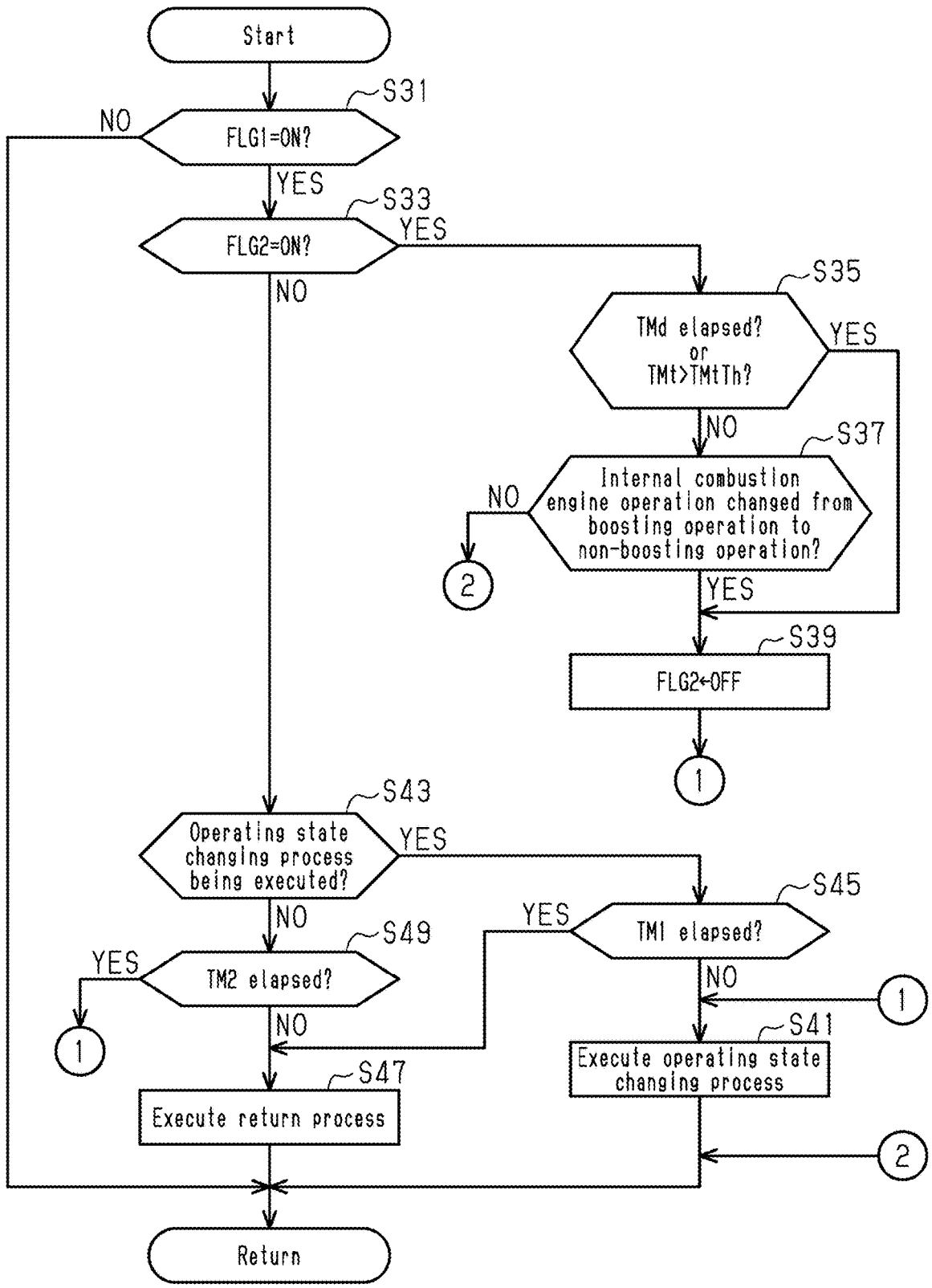
FIG. 7 is a flowchart illustrating a processing routine executed by the vehicle controller of the first embodiment shown in FIG. 1.

A processing routine that is executed to prevent water from being frozen in the blow-by gas supply passage will now be described with reference to FIG. 7. The processing routine is repeatedly executed in a predetermined control cycle by the CPU 71 executing the control programs.

In the processing routine, the CPU 71 determines in step S31 whether the first execution flag FLG1 is set to ON. When the first execution flag FLG1 is set to ON (S31: YES), the CPU 71 advances the process to step S33. When the first execution flag FLG1 is set to OFF (S31: NO), the CPU 71 temporarily ends the processing routine.

In step S33, the CPU 71 determines whether the second execution flag FLG2 is set to ON. When the second execution flag FLG2 is set to ON (S33: YES), the CPU 71 advances the process to step S35.

In step S35, the CPU 71 determines whether at least one of the following two conditions (B1) and (B2) is satisfied.

Condition (B1): A predetermined delay time TMd has elapsed since the first execution flag FLG1 was set to ON.

Condition (B2): A cumulative time TMt in a state in which the first execution flag FLG1 is set to ON is greater than a determination cumulative time TMtTh.

For example, the delay time TMd is longer than one minute. Even if the first execution flag FLG1 is set to ON, water will not be immediately frozen in the blow-by gas supply passage. In other words, the operating state changing process does not have to be executed during a period in which water is not frozen in the blow-by gas supply passage. The delay time TMd is set as a criterion for determining whether water starts to be frozen in the blow-by gas supply passage.

When the first execution flag FLG1 is intermittently set to ON, water is likely to be frozen in the blow-by gas supply passage even if the duration of a state in which the first execution flag FLG1 remains ON has not reached the delay time TMd. Thus, when the cumulative time TMt becomes greater than the determination cumulative time TMtTh, the CPU 71 determines that the water is likely to start to be frozen in the blow-by gas supply passage. The determination cumulative time TMtTh is set to be longer than the delay time TMd. The cumulative time TMt is reset to zero when the operating state changing process is started.

In step S35, when at least one of the conditions (B1) and (B2) is satisfied (S35: YES), the CPU 71 advances the process to step S39. When neither the condition (B1) nor (B2) is satisfied (S35: NO), the CPU 71 advances the process to step S37.

In step S37, the CPU 71 determines whether the operation of the internal combustion engine 20 has changed from boosting operation to non-boosting operation although the operating state changing process is not executed. For example, when the transmission 12 is downshifted by a driver's accelerator operation or the like, the operation of the internal combustion engine 20 may change from boosting operation to non-boosting operation even if the operating state changing process is not executed. When the operation of the internal combustion engine 20 is changed to non-boosting operation, the pressure in the passage downstream portion 54a of the first passage 54 becomes less than the specified pressure. In this case, the PCV valve 53 may open. Thus, when the operation of the internal combustion engine 20 is changed to non-boosting operation (S37: YES), the CPU 71 advances the process to step S39. Thus, when the operation of the internal combustion engine 20 is not changed to non-boosting operation (S37: NO), the CPU 71 temporarily ends the processing routine.

In step S39, the CPU 71 sets the second execution flag FLG2 to OFF. Then, the CPU 71 advances the process to step S41.

In step S41, the CPU 71 executes the operating state changing process. Then, the CPU 71 temporarily ends the processing routine.

When the second execution flag FLG2 is set to OFF in step S33 (S33: NO), the CPU 71 advances the process to step S43.

In step S43, the CPU 71 determines whether the operating state changing process is being executed. When the operating state changing process is being executed (S43: YES), the CPU 71 advances the process to step S45. In step S45, the CPU 71 determines whether the duration of the operating state changing process is greater than a first elapsed period TM1. When the operating state changing process is executed only during the first elapsed period TM1, it is estimated that water will not be frozen subsequently in the blow-by gas supply passage for a certain period of time even after the PCV valve 53 is closed. When the duration of the operating state changing process is not greater than the first elapsed period TM1 (S45: NO), the CPU 71 advances the process to step S41. That is, the CPU 71 continues to execute the operating state changing process.

When the duration of the operating state changing process is greater than the first elapsed period TM1 (S45: YES), the CPU 71 advances the process to step S47. In step S47, the CPU 71 executes a return process. Specifically, the CPU 71 executes the return process to return the value of the gear position selected by the transmission 12 to the gear position obtained prior to the execution of the operating state changing process. Further, even when changing the gear position selected by the transmission 12, the CPU 71 controls the operation of the internal combustion engine 20 such that the output torque of the internal combustion engine 20 is maintained. That is, the return process is a process that allows the operation of the internal combustion engine 20 to return to boosting operation and allows the PCV valve 53 to be closed. Then, the CPU 71 temporarily ends the processing routine.

When the operating state changing process is not being executed in step S43 (S43: NO), the return process is being executed. Thus, the CPU 71 advances the process to step S49. In step S49, the CPU 71 determines whether the duration of the return process is greater than a second elapsed period TM2. When the duration of the return process is greater than the second elapsed period TM2, water is again likely to be frozen in the blow-by gas supply passage. When the duration of the return process is not greater than the second elapsed period TM2 (S49: NO), the CPU 71 advances the process to step S47. That is, the CPU 71 continues to execute the return process. When the duration of the return process is greater than the second elapsed period TM2 (S49: YES), the CPU 71 advances the process to step S41. That is, the CPU 71 starts the operating state changing process.

Operation and Advantages of Present Embodiment

The operation obtained when the vehicle 10 is traveling under an extremely low-temperature condition in which the ambient temperature TMP is less than or equal to the determination temperature TMPth will now be described.

When the operation of the internal combustion engine 20 is boosting operation, the PCV valve 53 is closed. Thus, in the blow-by gas processing device 50, the blow-by gas in the accumulation chamber 51 is supplied to the intake passage 31 from the second passage 55, instead of the first passage 54.

As the travel speed SP becomes higher, the amount of cooling performed on the blow-by gas supply passage by relative wind becomes larger. That is, when the travel speed SP is greater than or equal to the determination speed SPth, the amount of cooling performed on the first passage 54 by relative wind becomes larger and thus the first passage 54 is supercooled. When the first passage 54 is supercooled in a state in which a relatively high-temperature blow-by gas does not flow through the first passage 54, the amount of cooling performed on the first passage 54 by relative wind is larger than the amount in which the first passage 54 receives heat from the internal combustion engine 20. Thus, when the first passage 54 continues to be supercooled in a state in which no blow-by gas flows through the first passage 54, the water contained in the first passage 54 may potentially be frozen.

When blow-by gas flows through the second passage 55, the blow-by gas is cooled by relative wind. The shortest distance from the cylinders 27 to the portion of the second passage 55 connected to the intake passage 31 is longer than the shortest distance from the cylinders 27 to the portion of the first passage 54 connected to the intake passage 31. Thus, when the second passage 55 is supercooled, the amount in which the second passage 55 receives heat from the internal combustion engine 20 when blow-by gas flows through the second passage 55 will not be larger than the amount of cooling performed on the second passage 55 by relative wind. Accordingly, when blow-by gas flows through the supercooled second passage 55, the water contained in the blow-by gas may potentially be frozen in the second passage 55.

When the condition in which the ambient temperature TMP is less than or equal to the determination temperature TMPth (S11: YES), the condition in which the PCV valve 53 is determined as being closed (S13: YES), and the condition in which the blow-by gas supply passage is determined as being supercooled (S15: YES) are all satisfied, a water freezing condition is satisfied. In the present embodiment, when the water freezing condition is satisfied, the operating state changing process is executed (S41). When the operating state changing process is executed, the transmission 12 selects a gear position that is lower than the one obtained prior to the execution of the operating state changing process such that a condition in which the output torque of the internal combustion engine 20 is maintained and a condition in which the operation of the internal combustion engine 20 is changed to non-boosting operation are both satisfied. That is, the gear ratio of the transmission 12 is changed to be a lower ratio.

When the operating state changing process is executed, the pressure in the passage downstream portion 54a of the first passage 54 becomes less than the specified pressure so that the PCV valve 53 opens. This allows the blow-by gas in the accumulation chamber 51 to be supplied to the intake passage 31 through the first passage 54. As a result, a relatively high-temperature blow-by gas flows through the first passage 54. Thus, the inside of the first passage 54 is heated. That is, the amount in which the first passage 54 receives heat from the internal combustion engine 20 becomes greater than the amount of cooling performed on the first passage 54 by relative wind. This prevents water from being frozen in the first passage 54.

When the PCV valve 53 opens so that blow-by gas flows through the first passage 54, no blow-by gas flows through the second passage 55. As a result, the air having a temperature that is relatively close to the ambient temperature TMP flows into the second passage 55 from the intake passage 31. During the flow of the air having a temperature relatively close to the ambient temperature TMP through the second passage 55, the air is not significantly cooled by relative wind. Consequently, water is not frozen in the second passage 55. That is, the present embodiment prevents water from being frozen in the first passage 54 and the second passage 55 when the vehicle 10 is traveling.

The present embodiment further achieves the following advantages.

(1-1) When the travel speed SP is greater than or equal to the determination speed SPth, the first passage 54 is determined as being supercooled (S15). When the first passage 54 is determined as being supercooled, the operating state changing process is executed to open the PCV valve 53. This prevents water from being frozen in the first passage 54.

(1-2) In the present embodiment, the travel speed SP and the engine rotation speed Ne are used to determine whether the second passage 55 is supercooled (S15). When it is determined using the travel speed SP and the engine rotation speed Ne that the second passage 55 is supercooled, the operating state changing process is executed. This prevents water from being frozen in the second passage 55.

(1-3) When the operating state changing process is executed, the gear position selected by the transmission 12 is changed such that the pressure in the passage downstream portion 54a becomes less than the specified pressure. Thus, executing the operating state changing process opens the PCV valve 53. Further, even when the operating state changing process is executed, the output torque of the internal combustion engine 20 is maintained. This prevents water from being frozen in the first passage 54 and the second passage 55 while also preventing the travel speed SP from changing.

(1-4) During the execution of the operating state changing process, the transmission 12 does not select a higher gear position. When the transmission 12 does not select a higher gear position, the driver of the vehicle 10 may feel uncomfortable. In addition, even when the water freezing condition is satisfied, water will not be immediately frozen in the first passage 54 or the second passage 55. That is, after the operating state changing process is executed, water will not be frozen in the first passage 54 or the second passage 55 even if the PCV valve 53 remains closed for a certain period of time.

Thus, the present embodiment alternately executes the operating state changing process (S41) and the return process (S47). Accordingly, even when the water freezing condition is satisfied (S11, S13, S15: YES), there is a period during which the transmission 12 can select a higher gear position. This prevents water from being frozen in the first passage 54 and the second passage 55 while also allowing the transmission 12 to select a higher gear position.

(1-5) In the present embodiment, even when the water freezing condition is satisfied (S11, S13, S15: YES), the state in which the transmission 12 selects a higher gear position can be continued until the delay time TMd has elapsed (S35: NO). When the delay time TMd has elapsed (S35: YES), the operating state changing process (S41) is executed to open the PCV valve 53. This prevents water from being frozen in the first passage 54 and the second passage 55 while also providing a period during which the transmission 12 can select a higher gear position.

(1-6) Even when the water freezing condition is satisfied (S11, S13, S15: YES), there is a period during which the operating state changing process is not executed. In such a period during which the operating state changing process is not executed, the operating state of the internal combustion engine 20 changes so that the PCV valve 53 may open (S37: YES). Thus, in a case in which the PCV valve 53 opens after the operating state of the internal combustion engine 20 in the period during which the operating state changing process is not executed, the CPU 71 determines that the PCV valve 53 opens because of the execution of the operating state changing process. This allows the return process to be started at a relatively early time. That is, the state in which the transmission 12 is prohibited from selecting a higher gear position is cancelled at a relatively early time. This allows the transmission 12 to select a higher gear position more often while also preventing water from being frozen in the first passage 54 and the second passage 55.

(1-7) Depending on how the driver uses the vehicle 10, the operating state changing process may be unable to be executed even if the cumulative time TMt reaches a certain time. When the cumulative time TMt reaches a certain time, water may start to be frozen in the first passage 54 and the second passage 55 even if the delay time TMd is not reached. Thus, in the present embodiment, when the cumulative time TMt is greater than the determination cumulative time TMtTh (S35: YES), the operating state changing process (S41) is started even if the duration of the state in which the water freezing condition is satisfied has not reached reach the delay time TMd. This prevents situations in which water is frozen in at least one of the first passage 54 and the second passage 55 because the operating state changing process is not executed.

Figure 8:
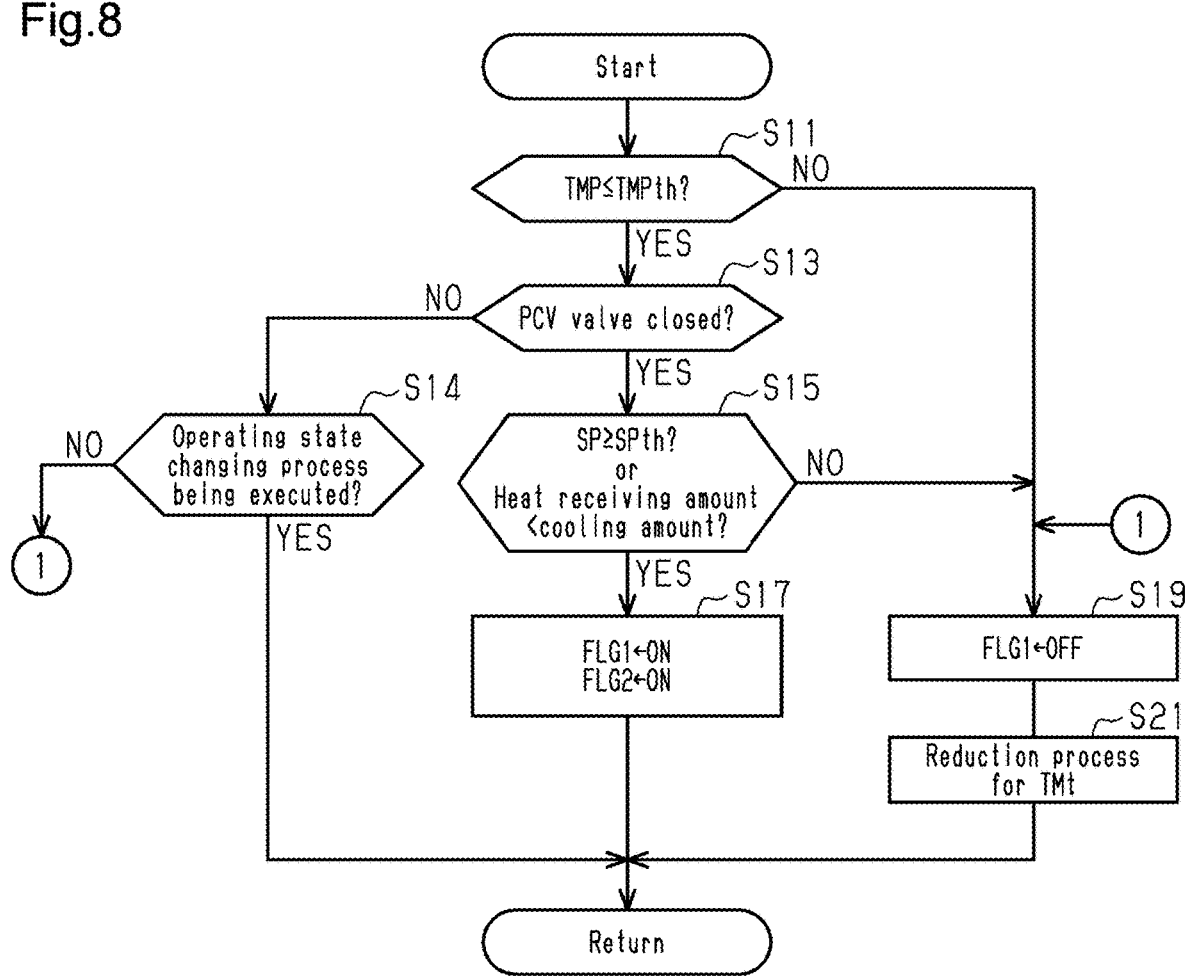
FIG. 8 is a flowchart illustrating a processing routine executed by the vehicle controller shown according to a second embodiment.

A second embodiment of the vehicle controller will now be described with reference to FIG. 8. The second embodiment is different from the first embodiment in some of the processes of the vehicle controller. Accordingly, differences from the first embodiment will mainly be described below. Like or the same reference numerals are given to those components that are the same as the corresponding components of the first embodiment. Such components will not be described.

Process that Determines Whether Water is Likely to be Frozen in Blow-by Gas Supply Passage A processing routine that determines whether water is likely to be frozen in the blow-by gas supply passage will now be described with reference to FIG. 8. The processing routine is repeatedly executed in a predetermined control cycle by the CPU 71 executing the control programs.

In the processing routine, the CPU 71 determines in step S11 whether the ambient temperature TMP of the vehicle 10 is less than or equal to the determination temperature TMPth. When the ambient temperature TMP is greater than the determination temperature TMPth (S11: NO), the CPU 71 advances the process to step S19. When the ambient temperature TMP is less than or equal to the determination temperature TMPth (S11: YES), the CPU 71 advances the process to step S13.

In step S13, the CPU 71 determines whether the PCV valve 53 is closed. When determining that the PCV valve 53 is not closed (S13: NO), the CPU 71 advances the process to step S14. When determining that the PCV valve 53 is closed (S13: YES), the CPU 71 advances the process to step S15.

In step S14, the CPU 71 determines whether the operating state changing process is being executed. When the operating state changing process is being executed (S14: YES), the CPU 71 temporarily ends the processing routine. When the operating state changing process is not being executed (S14: NO), the CPU 71 advances the process to step S19.

In step S15, the CPU 71 determines whether at least one of the above two conditions (A1) and (A2) is satisfied. When at least one of the conditions (A1) and (A2) is satisfied (S15: YES), the CPU 71 advances the process to step S17. When neither the condition (A1) nor (A2) is satisfied (S15: NO), the CPU 71 advances the process to step S19.

In step S17, the CPU 71 sets a first execution flag FLG1 and a second execution flag FLG2 to ON. Then, the CPU 71 temporarily ends the processing routine.

In step S19, the CPU 71 sets the first execution flag FLG1 to OFF. Then, in step S21, the CPU 71 executes a reduction process that reduces the cumulative time TMt. For example, the CPU 71 obtains, as a new cumulative time TMt, the larger one of zero and the value obtained by subtracting a predetermined correction time $\Delta TM$ from the cumulative time TMt. Then, the CPU 71 temporarily ends the processing routine.

Operation and Advantages of Present Embodiment

The present embodiment further provides the following advantage in addition to advantages (1-1) to (1-7) of the first embodiment.

(2-1) When the water freezing condition is not satisfied, water is not frozen in the first passage 54 or the second passage 55. Thus, in the present embodiment, when the water freezing condition is not satisfied (S11: NO, S13: NO, S15: NO), the cumulative time TMt is reduced (S21). This prevents situations in which the operating state changing process starts when the cumulative time TMt becomes greater than or equal to the determination cumulative time TMtTh although the water is not frozen in the first passage 54 or the second passage 55. This prevents the operating state changing process from being executed more often while also preventing water from being frozen in the first passage 54 and the second passage 55.

A third embodiment of the vehicle controller will now be described with reference to FIGS. 9 and 10. The third embodiment is different from the above embodiments in that the vehicle in which the vehicle controller is employed is a hybrid electric vehicle, in the operating state changing process, and the like. Accordingly, differences from the above embodiments will mainly be described below. Like or the same reference numerals are given to those components that are the same as the corresponding components of the above embodiments. Such components will not be described.

Figure 9:
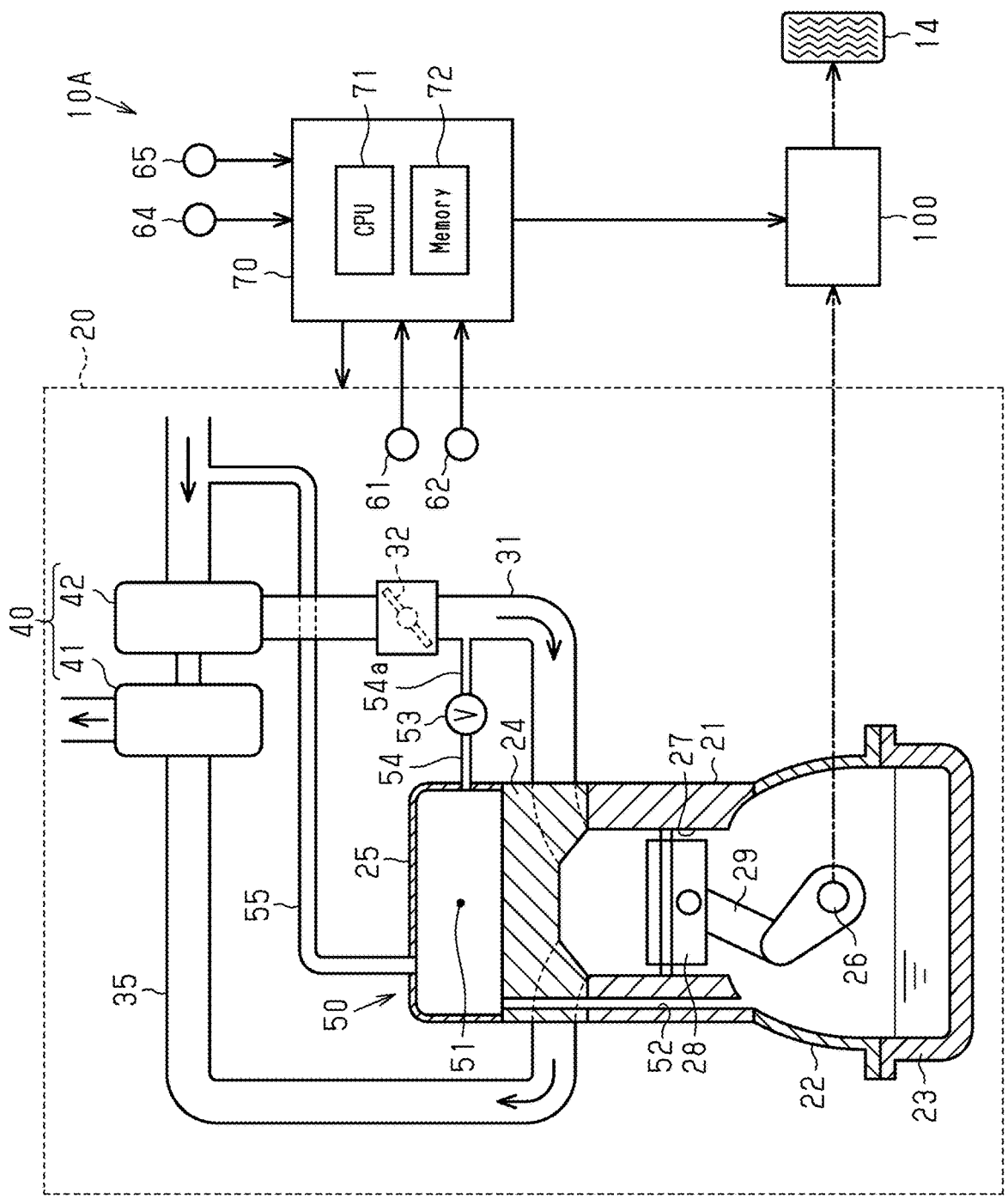
FIG. 9 is a diagram schematically showing the configuration of a vehicle that includes the vehicle controller according to a third embodiment.
Figure 10:
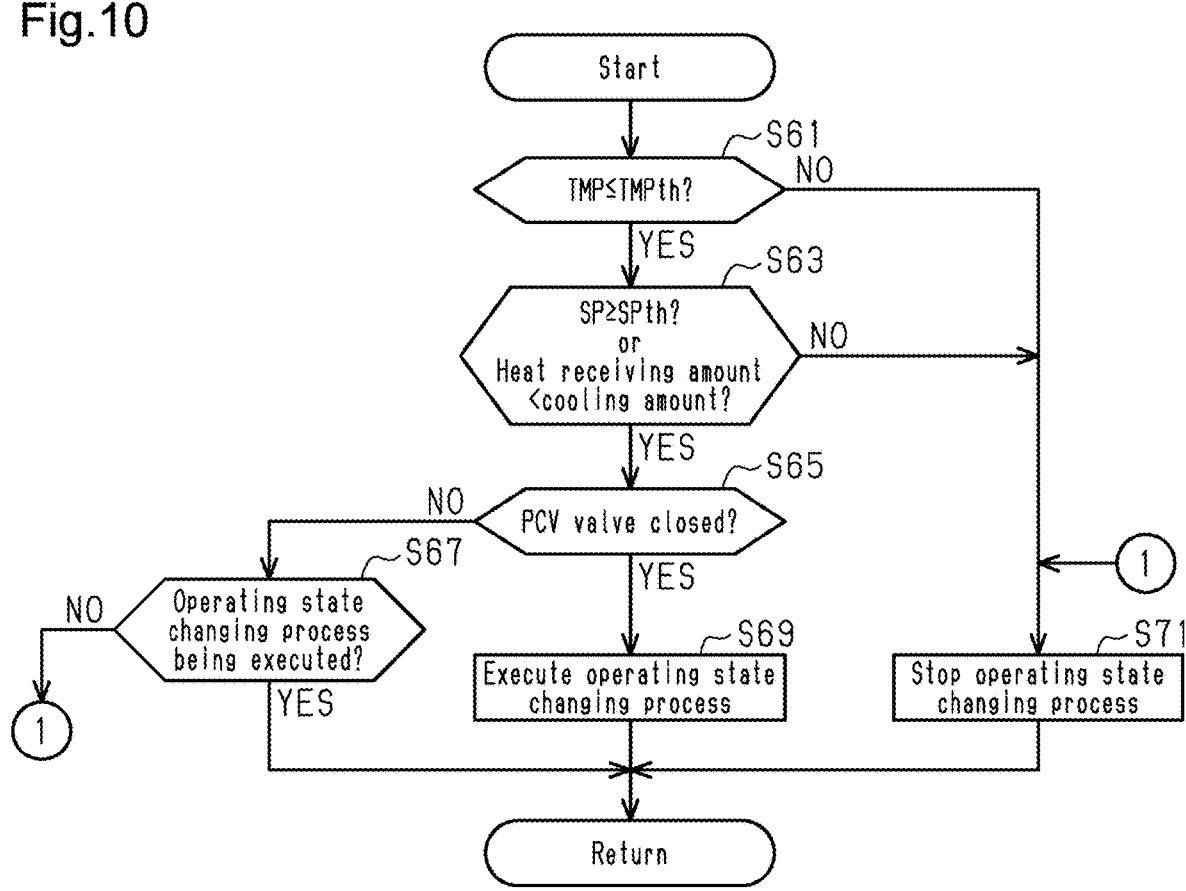
FIG. 10 is a flowchart illustrating a processing routine executed by the vehicle controller of the third embodiment shown in FIG. 9.

FIG. 9 shows a vehicle 10A in which the controller 70 (vehicle controller) is employed. The vehicle 10A is a hybrid electric vehicle that includes the internal combustion engine 20 and a motor generator 100 as a power source.

Process that Prevents Situations in which Water is Frozen in Blow-by Gas Supply Passage A processing routine that prevents situations in which water is frozen in the blow-by gas supply passage will now be described with reference to FIG. 10. The processing routine is repeatedly executed in a predetermined control cycle by the CPU 71 executing the control programs.

In the processing routine, the CPU 71 determines in step S61 whether the ambient temperature TMP is less than or equal to the determination temperature TMPth in the same manner as step S11. When the ambient temperature TMP is less than or equal to the determination temperature TMPth (S61: YES), the CPU 71 advances the process to step S63. When the ambient temperature TMP is greater than the determination temperature TMPth (S61: NO), the CPU 71 advances the process to step S71.

In step S63, the CPU 71 determines whether at least one of the above two conditions (A1) and (A2) is satisfied in the same manner as step S15. When at least one of the conditions (A1) and (A2) is satisfied (S63: YES), the CPU 71 advances the process to step S65. When neither the condition (A1) nor (A2) is satisfied (S63: NO), the CPU 71 advances the process to step S71.

In step S65, the CPU 71 determines whether the PCV valve 53 is closed in the same manner as step S13. When determining that the PCV valve 53 is closed (S65: YES), the CPU 71 advances the process to step S69. When determining that the PCV valve 53 is not closed (S65: NO), the CPU 71 advances the process to step S67.

In step S67, the CPU 71 determines whether the operating state changing process is being executed. When the operating state changing process is being executed (S67: YES), the CPU 71 temporarily ends the processing routine. That is, the CPU 71 continues to execute the operating state changing process. When the operating state changing process is not being executed (S67: NO), the CPU 71 advances the process to step S71.

In step S69, the CPU 71 executes the operating state changing process. That is, the CPU 71 executes the operating state changing process to change the operation of the internal combustion engine 20 to non-boosting operation such that the pressure in the passage downstream portion 54a becomes less than the specified pressure. When the operating state of the internal combustion engine 20 is changed in this manner, the driving torque received by the driven wheels 14 is reduced. Thus, in the operating state changing process, the CPU 71 of the present embodiment increases the output torque of the motor generator 100 to compensate for a decrease in the output torque of the internal combustion engine 20. Then, the CPU 71 temporarily ends the processing routine.

In step S71, the CPU 71 stops the operating state changing process. That is, the CPU 71 increases the output torque of the internal combustion engine 20 while also setting the output torque of the motor generator 100 to be lower than that obtained before the operating state changing process is stopped. That is, the CPU 71 permits the operation of the internal combustion engine 20 to change to boosting operation. Then, the CPU 71 temporarily ends the processing routine.

Operation and Advantages of Present Embodiment

In the operation of the present embodiment, the differences from those of the above embodiments will be mainly described.

When the water freezing condition is satisfied (S61, S63, S65: YES), water may be frozen in the first passage 54 and the second passage 55. Thus, the operating state changing process is executed (S69). Specifically, the operation of the internal combustion engine 20 is changed to non-boosting operation such that the pressure in the passage downstream portion 54a of the first passage 54 becomes less than the specified pressure. Further, the output torque of the motor generator 100 is increased to compensate for a decrease in the output torque of the internal combustion engine 20 that results from a decrease in the pressure in the passage downstream portion 54a. This prevents the travel speed SP of the vehicle 10A from being changed when the operating state changing process is executed.

When the pressure in the passage downstream portion 54a becomes less than the specified pressure, the PCV valve 53 opens (S65: NO). This allows the blow-by gas in the accumulation chamber 51 to be supplied to the intake passage 31 through the first passage 54. In such a manner, the flow of a relatively high-temperature blow-by gas through the first passage 54 prevents water from being frozen in the first passage 54. When the PCV valve 53 opens so that blow-by gas flows through the first passage 54, no blow-by gas flows through the second passage 55. This prevents water from being frozen in the second passage 55. Accordingly, the present embodiment prevents water from being frozen in the first passage 54 and the second passage 55 while also limiting a decrease in the travel speed SP of the vehicle 10A.

The present embodiment achieves the same advantages as advantages (1-1) and (1-2) of the first embodiment.

Modifications

The above embodiments may be modified as follows. The above embodiments and the following modifications can be combined as long as the combined modifications remain technically consistent with each other.

In the operating state changing process executed in the third embodiment, the output torque of the motor generator 100 is increased. Thus, when the state of charge of the battery is not relatively large, the operating state changing process may be unable to be executed. To solve this problem, in a case in which the vehicle 10A includes a transmission, it is preferred that the operating state changing process of the third embodiment be executed when the state of charge of the battery is greater than or equal to a determination state of charge. When the state of charge of the battery is less than the determination state of charge, it is preferred that the operating state changing process of the first and second embodiments be executed.

In the first and second embodiments, the transmission of the vehicle 10 may be a continuously variable transmission.

In the second embodiment, when the operating state changing process is not executed and at least one of the determinations of steps S11, S13, S15 is not satisfied, the cumulative time TMt is reduced (S21). Instead, for example, the cumulative time TMt may be reset to zero.

In the first embodiment, the cumulative time TMt does not have to be measured.

In the first and second embodiments, the operating state changing process and the return process do not have to be alternately executed. That is, when the duration of the state in which the water freezing condition is satisfied reaches the delay time TMd, the operating state changing process may continue to be executed.

In the first and second embodiments, when the ambient temperature TMP is less than or equal to the determination temperature TMPth (S11: YES), the PCV valve 53 is determined as being closed (S13: YES), and the blow-by gas supply passage is determined as being supercooled (S15: YES), the operating state changing process may be started before the delay time TMd elapses.

In the embodiments, the supercooling determination process (S13) may include at least one of the process that determines whether the travel speed SP is greater than or equal to the determination speed SPth and the process that determines whether the second passage 55 is supercooled based on the travel speed SP and the engine rotation speed Ne.

As the ambient temperature TMP becomes lower, water is more likely to be frozen in the blow-by gas supply passage. To solve this problem, the delay time TMd may be set to be shorter as the ambient temperature TMP becomes lower. Further, the determination cumulative time TMtTh may be set to be shorter as the ambient temperature TMP becomes lower.

The determination speed SPth may be set to be lower as the ambient temperature TMP becomes lower.

The first elapsed period TM1 may be set to be longer as the ambient temperature TMP becomes lower. The second elapsed period TM2 may be set to be shorter as the ambient temperature TMP becomes lower.

In the embodiments, the pressure in the portion of the intake passage 31 downstream of the throttle valve 32 is estimated to determine that the PCV valve 53 is closed when the estimation value of that pressure is greater than or equal to the specified pressure. Instead, for example, in a case in which the internal combustion engine 20 includes a sensor that detects the pressure in the portion of the intake passage 31 downstream of the throttle valve 32, the PCV valve 53 may be determined as being closed when the detection value of the sensor is greater than or equal to the specified pressure.

The controller 70 is not limited to a device that includes a CPU and a ROM and executes software processing. That is, the controller 70 may be modified as long as it has any one of the following configurations (a) to (c):

(a) The controller 70 includes one or more processors that execute various processes in accordance with a computer program. The processor includes a CPU and a memory, such as a RAM and ROM. The memory stores program codes or instructions configured to cause the CPU to execute the processes. The memory, or a non-transitory computer-readable medium, includes any type of media that are accessible by general-purpose computers and dedicated computers.

(b) The controller 70 includes one or more dedicated hardware circuits that execute various processes. The dedicated hardware circuits include, for example, an application specific integrated circuit (ASIC) and a field programmable gate array (FPGA).

(c) The controller 70 includes a processor that executes part of various processes in accordance with a computer program and a dedicated hardware circuit that executes the remaining processes.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle controller employed in a vehicle that includes an internal combustion engine, the vehicle controller comprising execution circuitry configured to execute:

a valve-closed determination process that determines whether a PCV valve of a blow-by gas processing device is closed, wherein
a forced-induction device of the internal combustion engine includes a turbine disposed on an exhaust passage and a compressor disposed on an intake passage of the internal combustion engine,
the blow-by gas processing device includes a supply passage through which blow-by gas is supplied to the intake passage,
the supply passage includes a first passage and a second passage, the first passage being connected to a portion of the intake passage downstream of the compressor, and the second passage being connected to a portion of the intake passage upstream of the compressor, the PCV valve is located on the first passage,
the first passage includes a connection portion connected to the intake passage,
a portion of the first passage between the connection portion and the PCV valve is a passage downstream portion, and
the PCV valve is closed when pressure in the passage downstream portion becomes greater than or equal to a specified pressure;
a supercooling determination process that determines whether the supply passage is supercooled by relative wind of the vehicle based on a travel speed of the vehicle; and
an operating state changing process that sets the pressure in the passage downstream portion to be less than the specified pressure by setting operation of the internal combustion engine to non-boosting operation when a condition in which an ambient temperature of the vehicle is less than or equal to a determination temperature, a condition in which the PCV valve is determined as being closed through the valve-closed determination process, and a condition in which the supply passage is determined as being supercooled through the supercooling determination process are all satisfied, wherein
boosting operation is operation of the internal combustion engine in which intake air flowing through the intake passage is pressurized using the forced-induction device, and
the non-boosting operation is operation of the internal combustion engine in which the intake air is not pressurized using the forced-induction device.

2. The vehicle controller according to claim 1, wherein the execution circuitry is configured to determine, in the supercooling determination process, that the supply passage is supercooled when the travel speed is greater than or equal to a determination speed.

3. The vehicle controller according to claim 1, wherein the execution circuitry is configured to determine, in the supercooling determination process, whether the supply passage is supercooled based on the travel speed and an engine rotation speed of the internal combustion engine.

4. The controller according to claim 1, wherein
the vehicle includes a transmission, and
the operating state changing process includes a process that changes a gear ratio of the transmission.

5. The vehicle controller according to claim 4, wherein
the execution circuitry is configured to alternately repeat the operating state changing process and a return process when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied, and
the return process returns the value of the gear ratio to a value of the gear ratio obtained before the operating state changing process was started.

6. The vehicle controller according to claim 4, wherein the execution circuitry is configured to start the operating state changing process after a predetermined delay time elapses when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied.

7. The vehicle controller according to claim 5, wherein, when the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied, the execution circuitry is configured to determine that the PCV valve was opened by executing the operating state changing process in a case in which the PCV valve opened when an operating state of the internal combustion engine changed in a period during which the operating state changing process was not executed.

8. The vehicle controller according to claim 6, wherein the execution circuitry is configured to execute:
measuring a cumulative time in a state in which the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process are all satisfied;
resetting the cumulative time when starting the operating state changing process; and
starting the operating state changing process when the cumulative time exceeds a determination cumulative time, the determination cumulative time being set to be longer than the delay time.

9. The vehicle controller according to claim 8, wherein the execution circuitry is configured to reset or reduce the cumulative time when one of the condition in which the ambient temperature of the vehicle is less than or equal to the determination temperature, the condition in which the PCV valve is determined as being closed through the valve-closed determination process, and the condition in which the supply passage is determined as being supercooled through the supercooling determination process is not satisfied.

10. The controller according to claim 1, wherein
the vehicle is a hybrid electric vehicle that further includes a motor generator as a power source, and
the operating state changing process includes increasing an output torque of the motor generator.

11. A vehicle control method employed in a vehicle that includes an internal combustion engine, the vehicle control method comprising:
determining, by execution circuitry, whether a PCV valve of a blow-by gas processing device is closed, wherein
a forced-induction device of the internal combustion engine includes a turbine disposed on an exhaust passage and a compressor disposed on an intake passage of the internal combustion engine,
the blow-by gas processing device includes a supply passage through which blow-by gas is supplied to the intake passage,
the supply passage includes a first passage and a second passage, the first passage being connected to a portion of the intake passage downstream of the compressor, and the second passage being connected to a portion of the intake passage upstream of the compressor,
the PCV valve is located on the first passage, the first passage includes a connection portion connected to the intake passage, a portion of the first passage between the connection portion and the PCV valve is a passage downstream portion, and the PCV valve is closed when pressure in the passage downstream portion becomes greater than or equal to a specified pressure;

determining, by the execution circuitry, whether the supply passage is supercooled by relative wind of the vehicle based on a travel speed of the vehicle; and setting, by the execution circuitry, the pressure in the passage downstream portion to be less than the specified pressure by setting operation of the internal combustion engine to non-boosting operation when a condition in which an ambient temperature of the vehicle is less than or equal to a determination temperature, a condition in which the PCV valve is determined as being closed, and a condition in which the supply passage is determined as being supercooled are all satisfied, wherein boosting operation is operation of the internal combustion engine in which intake air flowing through the intake passage is pressurized using the forced-induction device, and the non-boosting operation is operation of the internal combustion engine in which the intake air is not pressurized using the forced-induction device.

12. A non-transitory computer-readable memory medium that stores a program for causing a processor to execute a vehicle control process employed in a vehicle that includes an internal combustion engine, the vehicle control process comprising:

determining, by execution circuitry, whether a PCV valve of a blow-by gas processing device is closed, wherein a forced-induction device of the internal combustion engine includes a turbine disposed on an exhaust passage and a compressor disposed on an intake passage of the internal combustion engine, the blow-by gas processing device includes a supply passage through which blow-by gas is supplied to the intake passage, the supply passage includes a first passage and a second passage, the first passage being connected to a portion of the intake passage downstream of the compressor, and the second passage being connected to a portion of the intake passage upstream of the compressor, the PCV valve is located on the first passage, the first passage includes a connection portion connected to the intake passage, a portion of the first passage between the connection portion and the PCV valve is a passage downstream portion, and the PCV valve is closed when pressure in the passage downstream portion becomes greater than or equal to a specified pressure;

determining, by the execution circuitry, whether the supply passage is supercooled by relative wind of the vehicle based on a travel speed of the vehicle; and setting, by the execution circuitry, the pressure in the passage downstream portion to be less than the specified pressure by setting operation of the internal combustion engine to non-boosting operation when a condition in which an ambient temperature of the vehicle is less than or equal to a determination temperature, a condition in which the PCV valve is determined as being closed, and a condition in which the supply passage is determined as being supercooled are all satisfied, wherein boosting operation is operation of the internal combustion engine in which intake air flowing through the intake passage is pressurized using the forced-induction device, and the non-boosting operation is operation of the internal combustion engine in which the intake air is not pressurized using the forced-induction device.

\* \* \* \* \*